United States Patent
Amendola et al.

(10) Patent No.: US 7,019,105 B2
(45) Date of Patent: Mar. 28, 2006

(54) COMPOSITIONS AND PROCESSES FOR SYNTHESIZING BOROHYDRIDE COMPOUNDS

(75) Inventors: Steven C. Amendola, Ocean, NJ (US); Michael T. Kelly, Plainsboro, NJ (US)

(73) Assignee: Millennium Cell, Inc., Eatontown, NJ (US)

( * ) Notice: Subject to any disclaimer, the term of this patent is extended or adjusted under 35 U.S.C. 154(b) by 502 days.

(21) Appl. No.: 10/116,767

(22) Filed: Apr. 4, 2002

(65) Prior Publication Data

US 2004/0191152 A1    Sep. 30, 2004

Related U.S. Application Data

(62) Division of application No. 09/710,041, filed on Nov. 8, 2000, now Pat. No. 6,433,129.

(51) Int. Cl.
     C08G 70/08    (2006.01)
(52) U.S. Cl. .................. 528/271; 528/394; 528/396
(58) Field of Classification Search ............. 528/394, 528/271, 396
     See application file for complete search history.

(56) References Cited

U.S. PATENT DOCUMENTS

| | | |
|---|---|---|
| 25,777 A | 10/1859 | Schubert et al. |
| 2,469,879 A | 5/1949 | Hurd |
| 2,534,533 A | 12/1950 | Schlesinger et al. |
| 2,684,888 A | 7/1954 | Pryde |
| 2,720,444 A | 10/1955 | Banus et al. |
| 2,855,353 A | 10/1958 | Huff et al. |
| 2,889,194 A | 6/1959 | McElroy et al. |
| 2,926,989 A | 3/1960 | Pryde |
| 2,926,991 A | 3/1960 | Bragdon et al. |
| 2,928,719 A | 3/1960 | Berner et al. |
| 2,934,401 A | 4/1960 | Hansley et al. |
| 2,938,767 A | 5/1960 | Huff et al. |
| 2,939,762 A | 6/1960 | Berner et al. |
| 2,942,935 A | 6/1960 | King et al. |
| 2,955,911 A | 10/1960 | Edwards et al. |
| 2,964,378 A | 12/1960 | Brown et al. |
| 2,969,274 A | 1/1961 | Kyllonen |
| 2,970,894 A | 2/1961 | Chappelow et al. |
| 2,974,015 A | 3/1961 | Peterson |
| 2,983,574 A | 5/1961 | Nigon |
| 2,983,575 A | 5/1961 | Cohen et al. |
| 2,985,510 A | 5/1961 | Kalb |
| 2,992,072 A | 7/1961 | Huff et al. |
| 2,992,266 A | 7/1961 | McElroy et al. |
| 3,002,806 A | 10/1961 | Governale et al. |

(Continued)

FOREIGN PATENT DOCUMENTS

CN    86108142    6/1988

(Continued)

OTHER PUBLICATIONS

A. Burg. H.I. Schlesinger; "Hydrides of Boron. III. Dimethoxyborine", J. Am. Chem. Soc., Oct. 1933, 55, p. 4020-4025.

(Continued)

*Primary Examiner*—Duc Truong
(74) *Attorney, Agent, or Firm*—Dickstein Shapiro Morin & Oshinsky LLP (57) ABSTRACT

The present invention relates to compositions and processes for producing borohydride compounds. In particular, the present invention provides efficient processes and compositions for the large-scale production of borohydride compounds.

27 Claims, 2 Drawing Sheets

U.S. PATENT DOCUMENTS

| | | | |
|---|---|---|---|
| 3,014,059 | A | 12/1961 | Bush et al. |
| 3,014,060 | A | 12/1961 | Bush et al. |
| 3,021,197 | A | 2/1962 | Clark et al. |
| 3,022,138 | A | 2/1962 | Clark et al. |
| 3,028,221 | A | 4/1962 | Schechter et al. |
| 3,029,128 | A | 4/1962 | Chamberlain |
| 3,042,485 | A | 7/1962 | Edwards |
| 3,047,358 | A | 7/1962 | Jenker |
| 3,077,376 | A | 2/1963 | Schubert et al. |
| 3,079,224 | A | 2/1963 | Huff |
| 3,152,861 | A | 10/1964 | Logan et al. |
| 3,161,469 | A | 12/1964 | Ashby et al. |
| 3,164,441 | A | 1/1965 | Goerrig |
| 3,171,712 | A | 3/1965 | Edwards |
| 3,210,157 | A | 10/1965 | Lewis, Jr. et al. |
| 3,216,797 | A | 11/1965 | Murib et al. |
| 3,219,412 | A | 11/1965 | Hunt et al. |
| 3,222,121 | A | 12/1965 | Jenker et al. |
| 3,306,704 | A | 2/1967 | Campbell et al. |
| 3,459,514 | A | 8/1969 | Johnston et al. |
| 3,468,630 | A | 9/1969 | Raisor et al. |
| 3,471,268 | A | 10/1969 | Bontempelli et al. |
| 3,474,899 | A | 10/1969 | Carlsson et al. |
| 3,511,710 | A | 5/1970 | Jung et al. |
| 3,993,732 | A | 11/1976 | Filby |
| 4,002,726 | A | 1/1977 | Filby |
| 4,904,357 | A | 2/1990 | Sharifian et al. |
| 4,931,154 | A | 6/1990 | Hale et al. |
| 5,294,423 | A | 3/1994 | Lorthioir et al. |
| 5,886,229 | A | 3/1999 | Corella et al. |
| 6,433,129 | B1 * | 8/2002 | Amendola et al. .......... 528/271 |

FOREIGN PATENT DOCUMENTS

| | | |
|---|---|---|
| CZ | 148173 | 5/1972 |
| DE | 947702 | 8/1956 |
| DE | 949943 | 9/1956 |
| DE | 950062 | 10/1956 |
| DE | 950846 | 10/1956 |
| DE | 1036222 | 8/1958 |
| DE | 1053476 | 3/1959 |
| DE | 1058478 | 6/1959 |
| DE | 1095797 | 12/1960 |
| DE | 1262981 | 3/1968 |
| EP | 0313306 | 4/1989 |
| FR | 1301172 | 7/1962 |
| GB | 853727 | 11/1960 |
| GB | 1104200 | 2/1968 |
| JP | 2100376 | 4/1990 |
| NL | 6613329 | 9/1966 |

OTHER PUBLICATIONS

H.C. Brown, H.I. Schlesinger, A. Burg; "*Hydrides of Boron, XI. The Reaction of Diborane with Organic Compounds Containing a Carbonyl Group*"; J. Am. Chem. Soc., Mar. 1939, 61, p. 673-680.

Schlesinger, H.I.; Brown, H.C.; Hoekstra, H.R. Rapp, L.R.; "*Reactions of Diborane with Alkali Metal Hydrides and Their Additional Compounds. New Syntheses of Borohydrides. Sodium and Potassium Borohydrides*"; J. Am. Chem. Soc., Jan. 5, 1953, 75, p. 199-204.

Brown, H.C.; Schlesinger, H.I.; Sheft, I.; Ritter, D.M.; *New Developments in the Chemistry of Diborane and the Borohydrides*. J. Am. Chem. Soc., Jan. 5, 1973, 75, 186-225.

A.J. King, F.A. Kanda, V.A. Russell, & Walter Katz, *New Method for the Preparation of Borohydrides*, Syracuse University, Syracuse, NY), J. Am. Chem. Soc., vol. 78, p. 4176, Jun. 19, 1956.

Hughes, R.L., *Production of the Boranes and Related Research*; Midwest Research Institute, 1967.

Herbert C. Brown, Yong Moon Choi and S. Narasimhan for "*Additional Compounds of Alkali Metal Hydrides. 22. Convenient Procedures for the Preparation of Lithium Borohyride from Sodium Borohydride and Borane-Dimethyl Sulfide in Simple Ether Solvents*", Inorg. Chem. pp. 3657-3661, Mar. 25, 1982.

Hubbard, John L., Tetrahedron Letters; *Purification of Sodium and Potassium Hydrides; Preparation of Trialkylborohydrides with Exceptionally Large Steric Requirements*; J. American Chem. Soc., 1988, 29, 3197-3200.

Russian Article, Tom 34, 1989.

*Structure and Reactions of Tetrahydroborates: New Results with a Fascinating Ligand*, by H. Noth, M. Thomann, M. Bremer and G. Wagner, Institute for Inorganic Chemistry, University of Munich.

S. Narasimhan; K. Ganeshwar Prasad and S. Madhavan, *Calcium Borohydride; A Reagent For Facile Conversion of Carboxylic Esters to Alcohols and Aldehydes*, Synthetic Communications, 25(11), 1689-1697 (1995).

Jolles, Z.E., "Bromine and Its Compounds", Academic Press, pp. 81-89, 1966.

Huheey, James E. "Inorganic Chemistry", 3rd Edition, Harper Collins, Chapter 14, 1983 (pp. 726-741).

"CRC Handbook of Chemistry and Physics", 69th Edition, 1988-1989 (pp. D-55, D-58-D-63, D-84-D87).

Shriver et al., "Inorganic Chemistry", W.H. Freeman Company, 1990 (pp. 170-175).

Maurice E. Indig and Richard N. Snyder, "Sodium Borohydride, An Interesting Anodic Fuel".

Journal of the Electrochemical Society, vol. 109, pp. 1104-1106, Nov. 1962.

\* cited by examiner

COMPOSITIONS AND PROCESSES FOR SYNTHESIZING BOROHYDRIDE COMPOUNDS

This application is a DIV of Ser. No. 09/710,041 filed Nov. 8, 2000 now U.S. Pat. No. 6,433,129.

FIELD OF THE INVENTION

The present invention relates to compositions and processes for producing borohydride compounds. In particular, the present invention provides efficient processes and compositions for the large-scale production of borohydride compounds.

BACKGROUND OF INVENTION

Environmentally friendly fuels (e.g., alternative fuels to hydrocarbon based energy sources) are currently of great interest. One such fuel is borohydride, which can be used directly as an anodic fuel in a fuel cell or as a hydrogen storage medium (e.g., hydrogen can be liberated by the reaction of sodium borohydride with water, which produces sodium borate as a byproduct). As with all fuels, borohydride must be manufactured from readily available materials. Thus, there is a need for improved and energy efficient industrial scale manufacturing processes for producing borohydride compounds.

Typical industrial processes for the production of sodium borohydride are based on the Schlesinger process (Equation 1) or the Bayer process (Equation 2), which are both described below. Equation 1 illustrates the reaction of alkali metal hydrides with boric oxide, $B_2O_3$, or trimethoxyborate, $B(OCH_3)_3$, at high temperatures (e.g., ca. 330 to 350° C. for $B_2O_3$ and 275° C. for $B(OCH_3)_3$). These reactions, however, provide poor molar economy by requiring four moles of sodium to produce one mole of sodium borohydride.

$$4NaH + B(OCH_3)_3 \rightarrow 3NaOCH_3 + NaBH_4 \quad (1)$$

$$Na_2B_4O_7 + 16Na + 8H_2 + 7SiO_2 \rightarrow 4NaBH_4 + 7Na_2SiO_3 \quad (2)$$

The primary energy cost of these processes stems from the requirement for a large excess of sodium metal (e.g., 4 moles of sodium per mole of sodium borohydride produced). Sodium metal is commercially produced by electrolysis of sodium chloride with an energy input equivalent to about 17,566 BTU (18,528 KJ) per pound of sodium borohydride produced. In contrast, the hydrogen energy stored in borohydride is about 10,752 BTU (11,341 KJ) of hydrogen per pound of sodium borohydride. The Schlesinger process and the Bayer process, therefore, do not provide a favorable energy balance, because the energy cost of using such large amounts of sodium in these reactions is high compared to the energy available from sodium borohydride as a fuel.

Furthermore, in view of the large quantities of borohydride needed for use e.g., in the transportation industry, these processes would also produce large quantities of $NaOCH_3$ or $Na_2SiO_3$ waste products. Since these byproducts are not reclaimed or reused, further energy and/or expense would need to be expended to separate and dispose of these materials.

Typical improvements of the prior art describe simple modifications of the two processes given in equations 1 and 2. Accordingly, such improvements also suffer from the disadvantages stated above, and do not provide any improved energy efficiency. Furthermore, with the widespread adoption of borohydride as a source of hydrogen, a recycle process that allows regeneration of borohydride from borate is attractive. Thus, borohydride can be used as a fuel, and the resulting borate can then be recycled back to generate borohydride. Such a process cannot rely on the same sodium stoichiometry shown in the current borohydride manufacture processes, e.g., the Schlesinger process of Equation 1 or the Bayer process of Equation 2.

SUMMARY OF THE INVENTION

The present invention provides processes for producing large quantities of borohydride compounds, which overcome these deficiencies. In addition, the efficiencies of the processes of the present invention can be greatly enhanced over the typical processes for producing borohydride compounds.

In one embodiment of the present invention, a process is provided for producing borohydride compounds, which includes: (A) reacting methane with a Y-containing species of formula $Y_2O$ to obtain Y, carbon monoxide and $H_2$; (B) reacting the Y with $H_2$ to obtain YH; (C) reacting a boron-containing species of the formula $BX_3$ with the YH to obtain $YHBX_3$; (D) separately reacting $BX_3$ with $H_2$ to obtain $B_2H_6$ and HX; and (E) reacting the $YHBX_3$ with $B_2H_6$ to obtain $YBH_4$ and $BX_3$. Y is selected from the group consisting of the alkali metals, pseudo-alkali metals, an ammonium ion, and quaternary amines of formula $NR_4^+$, wherein R is independently selected from H and straight or branched C1 to C4 alkyl groups; and X is selected from the group consisting of halides, alcohols, alkoxides, chalcogens, and chalcogenides.

In another embodiment of the present invention, a process is provided for producing borohydride compounds, which includes: (A) reacting a boron-containing species of the formula $BX_3$ with $H_2$ to obtain $B_2H_6$ and HX; and (B) reacting the $B_2H_6$ with a Y-containing species of the formula $Y_2O$ to obtain a $YBH_4$ and a $YBO_2$. Y and X are the same as defined above.

In either of these embodiments, the Y-containing species of the formula $Y_2O$ and the boron-containing species of the formula $BX_3$ can be obtained by the following two processes. The first process includes: (1) reacting a borate of the formula $YBO_2$ with HX to obtain YX, $BX_3$, and water; (2) reacting the YX with water to obtain YOH and HX; and converting the YOH to $Y_2O$ and $H_2O$. The second process includes: (i) reacting a borate of the formula $YBO_2$ with $CO_2$ and $H_2O$ to obtain $YHCO_3$ and $B_2O_3$; (ii) converting the $YHCO_3$ to $Y_2O$, $CO_2$, and $H_2O$; and (iii) reacting the $B_2O_3$ with HX to obtain $BX_3$ and $H_2O$.

In still another embodiment of the present invention, a process is provided for producing borohydride compounds, which includes: (A) reacting a borate of the formula $YBO_2$ with $CO_2$ and $H_2O$ to obtain $YHCO_3$ and $B_2O_3$; (B) converting the $YHCO_3$ to $Y_2O$, $CO_2$, and $H_2O$; (C) reacting the $B_2O_3$ with C and $X_2$ to obtain $BX_3$ and $CO_2$; (D) reacting methane with $Y_2O$ to obtain Y, carbon monoxide and $H_2$; (E) reacting the Y with $H_2$ to obtain YH; (F) reacting the $BX_3$ with the YH to obtain $YHBX_3$; (G) separately reacting $BX_3$ with $H_2$ to obtain $B_2H_6$ and HX; and (H) reacting the $YHBX_3$ with $B_2H_6$ to obtain $YBH_4$ and $BX_3$. Y and X are the same as defined above.

In still another embodiment of the present invention, the process described in the previous embodiment is altered by replacing steps (D) to (H) with the following steps (D2) and (E2): (D2) reacting the $BX_3$ with $H_2$ to obtain $B_2H_6$ and HX; and (E2) reacting $B_2H_6$ with the $Y_2O$ to obtain a $YBH_4$ and a $YBO_2$.

BRIEF DESCRIPTION OF THE DRAWINGS

Further objects and advantages of the present invention will be more fully appreciated from a reading of the detailed description when considered with the accompanying drawings wherein.

DETAILED DESCRIPTION OF THE INVENTION

The present invention includes processes for producing borohydride compounds from sodium borate or sodium borate ores, such as borax ("borate species"). Each step of these processes can be conducted in a batchwise or continuous manner, as is well-known to the skilled artisan. The term "about," as used herein, means ±10% of the stated value.

The overall cost of producing borohydride compounds is net hydrogenation of a borate species (such as, sodium borate, borax ore, or higher borates of the formula $Na_2O \cdot xB_2O_3$, where x is 2 to 5, such as, tetraborate and pentaborate) to give sodium borohydride and water as shown in equation 3.

$$NaBO_2 + H_2 \rightarrow NaBH_4 + H_2O \quad (3)$$

The hydrogen can be obtained from any suitable source, as is well known to one skilled in the art. Where the hydrogen gas is liberated by steam reformation of methane, for example, the net reaction can be represented as illustrated in equation 4:

$$NaBO_2 + CH_4 \rightarrow NaBH_4 + CO_2 \quad (4)$$

These processes eliminate the dependence on excess sodium metal that exists in current industrial processes, thereby removing a large energy cost in borohydride production. In addition, these processes can allow for recycle of excess reagents and byproducts produced within the process in order to provide greater efficiency in the production of sodium borohydride.

An important distinction should be drawn between the processes of the present invention and the Schlesinger process. In the Schlesinger process, trimethoxyborane is added to excess sodium hydride (NaH), and the reaction driven to yield sodium borohydride and sodium methoxide. The excess NaH ensures that all intermediate borane species are reduced completely to borohydride. In an example of the processes of the present invention, however, an alkali metal hydride, e.g., sodium hydride, can be added to excess trialkoxyborane, e.g., trimethoxyborane, and the reaction only proceeds to form an alkali metal trialkoxyborohydride, e.g., sodium trimethoxyborohydride ($NaBH(OMe)_3$).

The basic starting material of the present process is a borate species, e.g., $YBO_2$, wherein Y is selected from the group consisting of alkali metals (e.g., H, Li, Na, K, Rb, Cs, and Fr), pseudo-alkali metals (e.g., Tl), alkaline earth metals (e.g., Be, Mg, Ca, Sr, and Ba), an ammonium ion ($NH_4^+$), and quaternary amines of formula $NR_4^+$, wherein R is independently selected from H and straight or branched C1 to C4 alkyl groups. Y is preferably selected from the group consisting of Na, Li, K, Mg, and Ca, and Y is most preferably Na or Li. Alternatively, $YBO_2$ can be substituted with sodium borate ores (e.g., borax) of the formula $Na_2O \cdot xB_2O_3$, wherein x is 1 to 5, as a starting material.

From the starting material of the borate species, reactions can be conducted to create a Y-containing species, i.e., $Y_2O$, and a boron-containing species, i.e., $BX_3$, from the $YBO_2$. X is selected from the group consisting of halides (F, Cl, Br, I, and At); alcohol or alkoxides of the formula —OR, wherein R is H or a straight or branched C1 to C4 alkyl group; chalcogens (O, S, Se, Te, and Po); and chalcogenides, such as —SR, —SeR, and —TeR, wherein R is H or a straight or branched C1 to C4 alkyl group.

For example, in one embodiment of this process, the Y-containing species and the boron-containing species are obtained by the following set of chemical reactions (5a) to (5c):

$$2YBO_2 + 8HX \rightarrow 2YX + 2BX_3 + 4H_2O \quad (5a)$$

$$2YX + 2H_2O \rightarrow 2YOH + 2HX \quad (5b)$$

$$2YOH \rightarrow Y_2O + H_2O \quad (5c)$$

The above set of reactions illustrates when Y is chosen to have a 1+ valence. When Y is chosen to have a 2+ valence, the stoichiometry can be adjusted accordingly. Such obvious changes in stoichiometry would be clearly evident to the skilled artisan. All of the following reactions assume that Y is chosen to have a valence of 1+.

In another embodiment, the Y-containing species and the boron-containing species can be obtained by the following set of chemical reactions (6a) to (6c):

$$2YBO_2 + 2CO_2 + H_2O \rightarrow 2YHCO_3 + B_2O_3 \quad (6a)$$

$$2YHCO_3 \rightarrow Y_2O + 2CO_2 + H_2O \quad (6b)$$

$$B_2O_3 + 6HX \rightarrow 2BX_3 + 3H_2O \quad (6c)$$

The reaction of equation (6b) can be substituted with the following reaction of equation (6bi).

$$2YHCO_3 \rightarrow Y_2CO_3 + H_2O + CO_2 \quad (6bi)$$

The reaction of (6bi) can be conducted at a temperature from about 50 to about 100° C. in an appropriate apparatus, such as a rotary drier. The solid $Y_2CO_3$ can be removed from the gaseous steam and $CO_2$ by any method and/or process known to the skilled artisan.

In still another embodiment, the Y-containing species and the boron-containing species can be obtained from borate processed from borate ores of the formula $Na_2O \cdot xB_2O_3$, wherein x=1 to 5, including hydrated ores, such as $NaB(OH)_4$. For example, borate ores can be used to obtain borate for processing according to the chemical reaction illustrated below.

$$2Na_2O \cdot 2B_2O_3 + 2CO_2 + H_2O \rightarrow 2NaBO_2 + 3B_2O_3 + 2NaHCO_3$$

The processing of borate ores is well-known in the art, as is described in Hughes, "Production of the Boranes and Related Research," p. 31 (1967, Academic Press), which reference is incorporated by reference in its entirety. Such sodium borate ores can be converted to (i) boric oxide, $B_2O_3$, (ii) the hydrate, boric acid, $B(OH)_3$, or (iii) $BX_3$ as shown below. The formation of boric oxide and boric acid are very similar reactions. The product obtained is dependent on the specific reaction conditions. For example, excess water and lower temperatures (e.g., from about room temperature to about 150° C. at from about atmospheric pressure to about 40 atmospheres) will favor formation of boric acid, as shown in reaction (7a). Higher temperatures (e.g., from about 150 to about 250° C. at from about atmospheric pressure to about 40 atmospheres) and less water will favor formation of boric oxide, as shown in reaction 8. Accordingly, the boron containing compound, $BX_3$, can be obtained from equations (7a) and (7b); the Y-containing species, $Y_2O$, can be obtained from $2YHCO_3$ from equations (7a) and (8), as described above; and $B_2O_3$ from equation (8) can be further processed to obtain additional boron-containing compounds, $BX_3$, as described above.

$$Y_2B_2O_4 + 2CO_2 + 4H_2O \rightarrow 2YHCO_3 + 2B(OH)_3 \tag{7a}$$

$$B(OH)_3 + 3HX \rightarrow BX_3 + 3H_2O \tag{7b}$$

$$Y_2B_2O_4 + 2CO_2 + H_2O \rightarrow 2YHCO_3 + B_2O_3 \tag{8}$$

Note that the reaction of equation (7a) can be conducted in two steps, as illustrated by equations (7ai) and (7aii) below.

$$Y_2B_2O_4 + 4H_2O \rightarrow 2YB(OH)_4 \tag{7ai}$$

$$2YB(OH)_4 + 2CO_2 \rightarrow 2YHCO_3 + 2B(OH)_3 \tag{7aii}$$

Chemical reactions with boric oxide are well-known in the art, as is described in Hughes, "Production of the Boranes and Related Research," pp. 1–52 (1967, Academic Press), which reference is incorporated by reference in its entirety.

After the Y-containing species and the boron-containing species have been obtained, a Y-borohydride can be obtained by a variety of processes. In one embodiment, the Y-borohydride can be obtained by the following set of equations (9a) to (9g):

$$CH_4 + Y_2O \rightarrow 2Y + CO + 2H_2 \tag{9a}$$

$$2Y + H_2 \rightarrow 2YH \tag{9b}$$

$$2BX_3 + 2YH \rightarrow 2YHBX_3 \tag{9c}$$

$$CH_4 + H_2O \rightarrow 3H_2 + CO \tag{9d}$$

$$2CO + 2H_2O \rightarrow 2H_2 + 2CO_2 \tag{9e}$$

$$2BX_3 + 6H_2 \rightarrow B_2H_6 + 6HX \tag{9f}$$

$$2YHBX_3 + B_2H_6 \rightarrow 2YBH_4 + 2BX_3 \tag{9g}$$

Note that if hydrogen is obtained from commercial sources, reactions (9d) and (9e) can be optional. Optionally, the hydrogen in equation (9f) can be substituted with formaldehyde ($CH_2O$), benzaldehyde ($C_6H_5CHO$), or acetaldehyde ($CH_3CHO$) in the presence of Cu metal catalyst. These aldehyde reactions can be run in an appropriate pressurized apparatus, such as an autoclave, at about 380 to about 420° C. One skilled in the art would recognize that the stoichiometry of equation (9f) would have to be adjusted accordingly.

Alternatively, the following reaction can be substituted for the last two reactions (9f) and (9g) of the above process:

$$2YHBX_3 + 6H_2 \rightarrow 2YBH_4 + 6HX \tag{9h}$$

If the reaction of equation (6bi) described above is used, the reaction of equation (9a) can be substituted with the following reaction of equation (9ai).

$$Y_2CO_3 + 2C \rightarrow 2Y + 3CO \tag{9ai}$$

The reaction of equation (9ai) can be conducted by adding heat in the presence of carbon, as is described in Hughes, "Production of the Boranes and Related Research," pp. 12.

The overall process of this embodiment with or without the alternative substitute reaction results in the following net reaction:

$$YBO_2 + CH_4 \rightarrow YBH_4 + CO_2 \tag{10}$$

In another embodiment, the Y-borohydride can be obtained by the following set of reactions (11a) to (11d):

$$4BX_3 + 12H_2 \rightarrow 2B_2H_6 + 12HX \tag{11a}$$

$$3CH_4 + 3H_2O \rightarrow 9H_2 + 3CO \tag{11b}$$

$$3CO + 3H_2O \rightarrow 3H_2 + 3CO_2 \tag{11c}$$

$$2Y_2O + 2B_2H_6 \rightarrow 3YBH_4 + YBO_2 \tag{11d}$$

Note that if hydrogen is purchased from commercial sources, reactions (11b) and (11c) can be optional. Note also that if a product of any of the reactions is used as a reactant in any of the reactions, a recycle loop is possible. Optionally, the hydrogen in equation (11a) can be substituted with formaldehyde ($CH_2O$), benzaldehyde ($C_6H_5CHO$), or acetaldehyde ($CH_3CHO$) in the presence of Cu metal catalyst. These aldehyde reactions can be run in an appropriate pressurized apparatus, such as an autoclave, at about 380 to about 420° C. One skilled in the art would recognize that the stoichiometry of equation (11a) would have to be adjusted accordingly.

Again, the overall process of this embodiment results in the following net reaction:

$$YBO_2 + CH_4 \rightarrow YBH_4 + CO_2 \tag{10}$$

In still another embodiment, halogens ($F_2$, $Cl_2$, $Br_2$, $I_2$, and $At_2$) can be used in a variation of the embodiment using equations (6a) to (6c) to obtain the Y-containing species and the boron-containing species. In this embodiment, equation (6c) is replaced with equation (6d) below:

$$B_2O_3 + 3/2C + 3X_2 \rightarrow 2BX_3 + 3/2CO_2 \tag{6d}$$

wherein C is carbon, and X is F, Cl, Br, I, or At, preferably Cl or Br. Alternatively, the carbon can be replaced with methane as illustrated by equation (6e) below:

$$B_2O_3 + 3/2CH_4 + 3X_2 \rightarrow 2BX_3 + 3/2CO_2 + H_2$$

wherein X is F, Cl, Br, I, or At, preferably Cl or Br.

When either of these halogen embodiments are utilized in conjunction with either equations (9a) to (9g) or (11a) to (11d) to obtain the Y-borohydride, the halogen can optionally be reclaimed for reuse from the HX produced in the reactions of equations (9f) or (11a) as illustrated in equation (11) below:

$$6HX + 3/2O_2 + CuX(solid) \rightarrow 3X_2 + 3H_2O \tag{11}$$

wherein CuX (solid) is a catalyst that is not consumed in the process, and for CuX, X is Cl, Br, or I.

Any of the above-described processes of obtaining a Y-containing species and a boron-containing species can be used with any of the above-described processes for obtaining a Y-borohydride.

In still another embodiment of the present invention, X can be independently chosen to be different throughout a complete process, i.e., a particular process for obtaining a Y-containing species and a boron-containing species, as described above, in combination with a particular process for obtaining a Y-borohydride, as described above. When X is changed in a complete process, it is preferable to choose the different X's to promote regeneration and use of a product as a reactant in a different reaction.

For example, in a combination of equations (6a) to (6c) and equations (9a) to (9g), X can be chosen to be a halide (e.g. F, Cl, Br, I, or At) in equations (6c) and (9f). This would allow recycling of the HX produced in equation (9f) for use in equation (6c). Similarly, X can be separately chosen to be an alkoxide (e.g., OMe) for equations (9c) and (9g). This would allow recycling of the $BX_3$ produced in equation (9g) for use in equation (9c).

Figure 1:
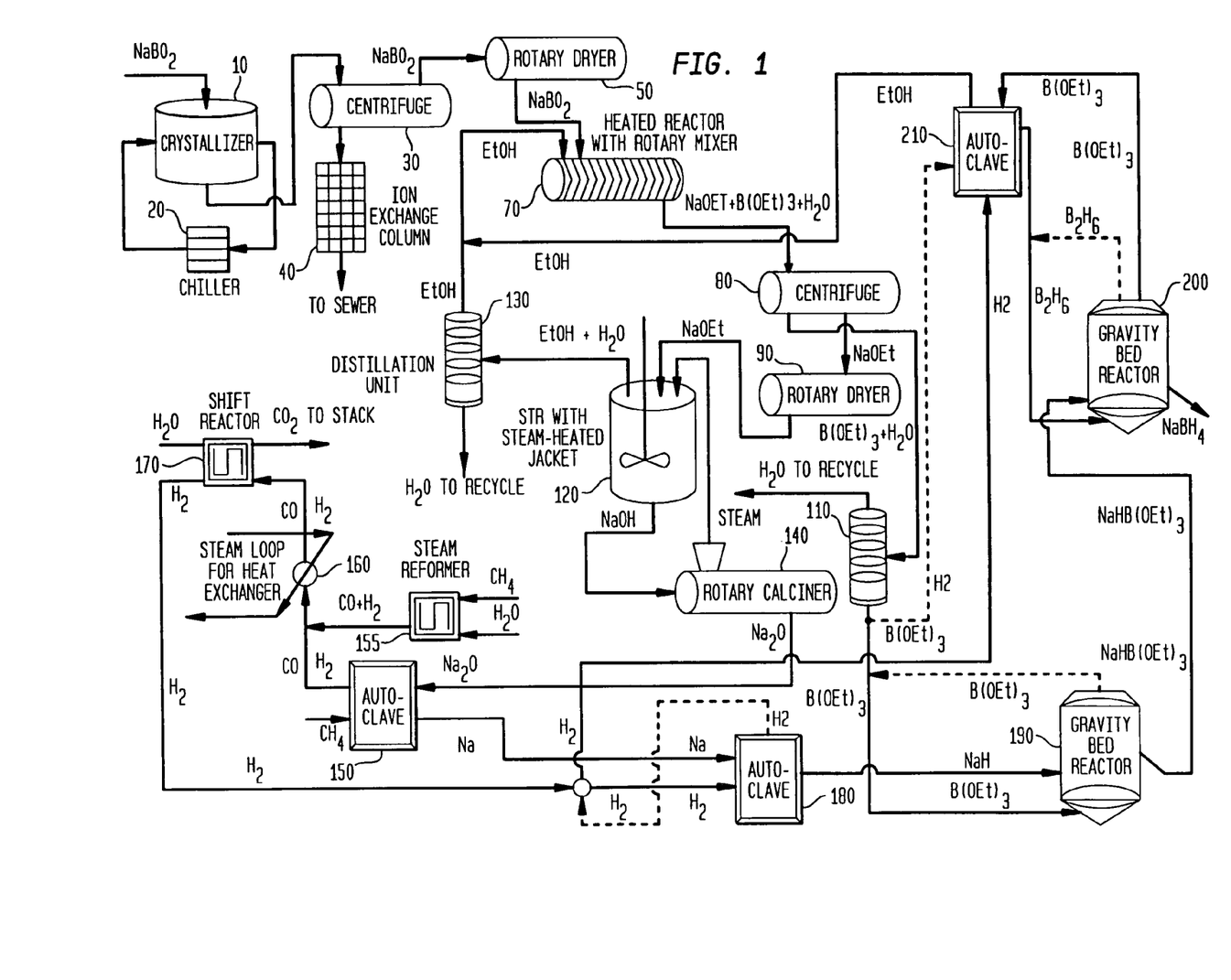
FIG. 1 is a flow diagram, which illustrates one embodiment for producing borohydride compounds in accordance with the present invention.

In an embodiment of the present invention, as illustrated in FIG. 1, $YBO_2$ is chosen to be sodium borate and HX is chosen to be ROH. The sodium borate and the alcohol are reacted to produce a trialkoxyborane. A portion of the trialkoxyborane is converted to alkali metal trialkoxyborohydride, and the remaining trialkoxyborane is converted to diborane. The trialkoxyborohydride and the diborane can then be reacted to form the desired borohydride compound. This process can be further described in part by the following set of chemical reactions and formulae.

First, sodium borate from rotary dryer 50 can be reacted with ethanol in an appropriate reactor, as provided in eq. (12).

$$NaBO_2 + 4EtOH \rightarrow NaOEt + B(OEt)_3 + 2H_2O \quad (12)$$

For example, this reaction can be performed in a heated reactor with a rotary mixer 70, such as a PORCUPINE PROCESSOR produced by The Bethlehem Corporation of Easton, Pa., as illustrated in FIG. 1. In such an apparatus, a slurry of sodium borate and ethanol can be stirred together by a heated screw, which allows mixing of the reagents at temperatures ranging from about room temperature to about 70° C., preferably from about 50° C. to about 70° C. and pressures from about 0 to about 100 psi (6.8 atm.), preferably from about 1 to about 2 atm. Acids such as inorganic mineral acids, organic acids, Naflon beads, and carbon dioxide, can be added as catalysts or activators. In a continuous process, the reagents are introduced into one end of the reactor, and the trialkoxyborane can be removed by distillation as it forms.

After separation, in an appropriate apparatus, such as a centrifuge 80, the triethoxyborate can be dried in an appropriate apparatus, such as a distillation unit 110. The water can be recycled for use in other chemical reactions. All or a portion of the dried triethoxyborate ($B(OEt)_3$) is then reacted with sodium hydride in an appropriate apparatus to provide sodium triethoxyhydroborate ($NaHB(OEt)_3$), as provided in eq. (13).

$$B(OEt)_3(excess) + NaH \rightarrow NaHB(OEt)_3 \quad (13)$$

The reaction of eq. (13) is exothermic. For example, this reaction can be performed in a gravity bed reactor 190, as illustrated in FIG. 1. In such an apparatus, excess liquid trialkoxyborate can be added to solid sodium hydride in a reactor equipped with paddle stirring. The mixture can be maintained at a temperature from about 0° C. and about 100° C., preferably from about 60 to about 70° C., for about 1 to about 24 hours, preferably from about 1 to about 6 hours, with stirring to disperse the solid. The excess borane can be removed by distillation, not shown, to give solid sodium triethoxyborohydride in quantitative yield.

A portion of the triethoxyborate obtained from the reaction of eq. (12) can be directed to an appropriate pressurized reactor and reacted with hydrogen gas to provide diborane ($B_2H_6$) and ethanol, as provided in eq. (14).

$$B(OEt)_3 + 3H_2 \rightarrow \tfrac{1}{2}B_2H_6 + 3EtOH \quad (14)$$

The chemical reaction of eq. (14) is endothermic. For example, this reaction can be performed in an autoclave 210, as illustrated in FIG. 1. In such an apparatus, an autoclave containing triethoxyborane can be pressurized with hydrogen gas to about 100–1000 psi (about 6.8 to about 68 atm.), preferably from about 14 to about 40 atm., and heated at temperatures ranging from about 100 to about 500° C., preferably from about 150 to about 300° C. Typical hydrogenation catalysts, including Raney nickel and activated palladium, silver, or platinum metals and other Group VIII metals, can be used to promote the reaction. The alcohol can be condensed from the gas stream and recycled for use in other parts of the process.

Lastly, the sodium triethoxyhydroborate from the reaction of eq. (13) can be directed to an appropriate apparatus to react with the diborane from the reaction of eq. (14) to obtain sodium borohydride and triethoxyborate, as provided in eq. (15).

$$NaHB(OEt)_3 + \tfrac{1}{2}B_2H_6 \rightarrow NaBH_4 + B(OEt)_3 \quad (15)$$

The chemical reaction of eq. (15) is exothermic. For example, this reaction can be performed in a gravity bed reactor 200, as illustrated in FIG. 1. In such an apparatus, a gas stream of diborane at pressures ranging from about atmospheric pressure to about 100 psi (6.8 atm.), preferably from about 1 to about 2 atm., can be passed through solid sodium triethoxyborate at temperatures ranging from about −30° C. to about 150° C., preferably from about 70° C. to about 120° C., under an inert atmosphere (such as nitrogen or argon gas). Excess triethoxyborate can be removed by any method or process known to one skilled in the art (e.g., by distillation or separation by gravity) to leave sodium borohydride in quantitative yield. The separated triethoxyborate can then be recycled for use in the reaction of eq. (14) as shown in FIG. 1 and/or in the reaction of eq. (13) to produce sodium triethoxyhydroborate.

The reactants for the chemical reactions of eqs. (12)–(15) can be purchased from commercial sources or, more preferably, can be synthesized in the process plant. In one embodiment of the present invention, sodium borate used in equation (12) can be obtained by purifying borate ore, e.g., mixing the borate ore in a mixing tank while cooling, centrifuging out any undesired materials, and drying the purified borate ore.

This process is illustrated in FIG. 1 as follows. Sodium borate is fed into a crystallizer 10. Some of this sodium borate passes in a recycle loop through a chiller 20. The sodium borate then passes into a centrifuge 30 to further purify the sodium borate. Impurities from the centrifuge are passed through an ion exchange column 40 and then disposed. The purified sodium borate is then passed into a rotary dryer 50.

Furthermore, the ethanol used in equation (12) can be obtained by reacting the sodium ethoxide (NaOEt) obtained from the products of the reaction of eq. (12) with steam in a suitable apparatus as described below in the reaction of eq. (16). The sodium ethoxide can be separated from the products of the reaction of eq. (12) and dried in appropriate apparatuses, such as a centrifuge 80 and a rotary dryer 90, as illustrated in FIG. 1.

$$NaOEt + H_2O \rightarrow EtOH + NaOH \quad (16)$$

For example, this reaction can be performed in a stirred tank reactor with a steam-heated jacket 120, as illustrated in FIG. 1. In such an apparatus, the slurry of sodium ethoxide and water from the reaction of eq. (12) can be transferred directly into a stirred tank reactor equipped with turbine stirring. The slurry can be heated at temperatures from about 0° C. to about 150° C., preferably from about 100° C. to about 150° C., and pressures ranging from about 0 psi (0 atm.) to about 100 psi (6.8 atm), preferably from about 0.5 to about 1.5 atm. Water can be removed by any known process or method known to the skilled artisan, such as by distillation, as illustrated by distillation unit 130 in FIG. 1. Ethanol can also be obtained from the reaction of eq. (14), after separating out the borane by any method or process known to one skilled in the art.

The sodium hydride (NaH) used in eq. (13) and the hydrogen used in eq. (14) can also be synthesized in the process plant, as follows. The sodium hydroxide (NaOH) produced in eq. (16) can be directed to a suitable vacuum dryer to produce sodium oxide (Na$_2$O) and water, as provided below in the chemical reaction of eq. (17).

$$2NaOH \rightarrow Na_2O + H_2O \tag{17}$$

For example, this reaction can be performed in a rotary calciner 140, which is commercially available from the Bethlehem Corporation. In such an apparatus, a slurry of sodium hydroxide can be heated to between about 400 and about 1000° C., preferably from about 450 to about 800° C., in a rotary dryer with a heated screw agitator, which is capable of dispersing the slurry along the length of the reactor. The high temperature allows the steam to be driven off the solid sodium oxide.

The water produced in this process step can be recycled back for use in the reaction of eq. (16). The sodium oxide can then be reacted with methane in a suitable apparatus to provide sodium, carbon monoxide and hydrogen, as provided below in the chemical reaction of eq. (18).

$$Na_2O + CH_4 \rightarrow 2Na + CO + 2H_2 \tag{18}$$

The chemical reaction of eq. (18) is endothermic. For example, this reaction can be performed in an autoclave 150. In such an apparatus, solid sodium oxide can be heated to from about 500 to about 1200° C., preferably from about 900 to about 1100° C., in an autoclave equipped with turbine stirring, and the reactor pressurized with methane gas (ranging from about atmospheric pressure (1 atm.) to about 1000 psi (68 atm.)). The solid can be stirred and heated under this atmosphere, and the product gas stream can be cooled to a temperature from about 100 to about 800° C., preferably from about 100 to about 400° C., to allow separation of molten sodium. The gas stream containing carbon monoxide and hydrogen can then be directed to an appropriate apparatus, such as a shift reactor 170, for reaction of carbon monoxide with steam to produce additional hydrogen gas, as described below.

The methane (natural gas), used in the reaction of eq. (18), can be purchased from commercial sources. The sodium produced in the reaction of eq. (18) can be easily removed from the other gaseous components, and carbon monoxide can also be removed by using an appropriate apparatus, as provided below in eq. (19).

$$CO + H_2O \rightarrow CO_2 + H_2 \tag{19}$$

For example, this reaction can be performed in a shift reactor 170. As is well-known to the skilled artisan, such an apparatus allows the reaction of CO and steam by passing the gas stream over iron and copper catalysts at approximately 425° C. to produce hydrogen and carbon dioxide.

Additional hydrogen gas can be produced by steam reforming of methane as shown in eq. (20).

$$CH_4 + H_2O \rightarrow 3H_2 + CO \tag{20}$$

For example, this reaction can be performed in a steam reformer 155, as illustrated in FIG. 1. As is well known to the skilled artisan, methane can be mixed with steam at temperatures from about 450 to about 750° C. and pressures from about 30 to about 40 atmospheres as it enters catalyst tubes containing a nickel catalyst to produce a gas stream of hydrogen and carbon monoxide. The hot gas stream can then be passed through a heat exchanger to provide process heat. Note that the carbon monoxide produced in this reaction can also be used in the reaction of eq. (19) to provide additional hydrogen.

The hydrogen produced in the reactions of equations (19) and (20) can be divided into two portions. One portion can be used in the chemical reaction of eq. (14) in apparatus 210. The other portion can be used to react with the sodium obtained in eq. (18) to provide sodium hydride (NaH) in an appropriate apparatus as provided below in eq. (21).

$$2Na + H_2 \rightarrow 2NaH \tag{21}$$

The sodium hydride can then be used in chemical reaction of eq. (13) in apparatus 190. For example, the reaction shown in equation (21) can be performed in an autoclave 180. In such an apparatus, molten sodium can be cooled to a temperature from about 100 and to about 800° C., preferably from about 100 to about 400° C., before being introduced into an autoclave equipped with turbine stirring. The reactor can be pressurized with hydrogen gas, ranging from about atmospheric pressure (1 atm.) to about 1000 psi (68 atm.), preferably from about 5 to about 20 atm., and the molten sodium can be agitated to allow thorough mixing. Since NaH is a solid, it can be easily separated by any method and/or process known to the skilled artisan.

The sum of equations (16) through (21) is the following equation:

$$2NaOH + CH_4 \rightarrow 2NaH + CO_2 + 2H_2 \tag{22}$$

The net equation represented by the equations (12) through (21) is as follows:

$$NaBO_2 + CH_4 \rightarrow NaBH_4 + CO_2 \tag{23}$$

The overall equation is endothermic, where the steps represented by equations (12), (14), (18), and (20) are the key energy-consuming steps of the process. Thermodynamic values for each of the reactions in this embodiment are shown below. All thermodynamic values are taken from the *CRC Handbook of Chemistry and Physics*, 69th Edition, 1988–1989, which is incorporated herein by reference. The overall process of this embodiment is also favorable in that it is a cyclic process best represented by the listing of all reactions below. As shown, the reaction can consume only methane and borate to produce sodium borohydride and carbon dioxide. All other reagents can be generated within the process.

| | | BTU/lb NaBH$_4$ |
|---|---|---|
| 2NaBO$_2$ + 8EtOH | → 2NaOEt + 2B(OEt)$_3$ + 4H$_2$O | 1208 BTU (1274 kJ) |
| 2NaOEt + 2H$_2$O | → 2NaOH + 2EtOH | |
| 2NaOH | → Na$_2$O + H$_2$O | 831 BTU (877 kJ) |
| CH$_4$ + Na$_2$O | → 2Na + CO + 2H$_2$ | 1642 BTU (1732 kJ) |
| 2Na + H$_2$ | → 2NaH | |
| 2B(OEt)$_3$ + 2NaH | → 2NaHB(OEt)$_3$ | |
| CH$_4$ + H$_2$O | → 3H$_2$ + CO | 856 BTU (903 kJ) |
| 2CO + 2H$_2$O | → 2H$_2$ + 2CO$_2$ | |
| 2B(OEt)$_3$ + 6H$_2$ | → B$_2$H$_6$ + 6EtOH | 2991 BTU (3155 kJ) |
| 2NaHB(OEt)$_3$ + B$_2$H$_6$ | → 2NaBH$_4$ + 2B(OEt)$_3$ | |
| 2NaBO$_2$ + 2CH$_4$ | → 2NaBH$_4$ + 2CO$_2$ | 7528 BTU (7941 kJ) |

15

For illustrative purposes, sodium borohydride can be reacted with water to produce hydrogen gas. The energy equivalent of hydrogen gas is about 50,957 BTU per pound. Since each pound of sodium borohydride can theoretically produce about 0.211 pounds of hydrogen gas, each pound of sodium borohydride can theoretically yield about 10,752 BTU. The actual cost of producing borohydride can be found by adding 7528 BTU from the above process, 1130 BTU (resulting from 15% plant inefficiency), and 9094 BTU (the energy equivalent of methane), giving a total of 17,752 BTU required to produce sodium borohydride in the plant. According to this calculation, the energy efficiency of producing sodium borohydride according to this embodiment of the present invention (e.g., the comparison of the energy needed for production versus the energy provided) would be about 61% (10,752/17,752×100).

This is a great improvement over commercial processes that generate sodium borohydride from sodium or sodium based compounds. Calculated on a per pound of sodium borohydride produced basis, the process shown in equation 1 requires the energy equivalent of 4,547 BTU of methane and an additional 18,476 BTU of energy to drive the reactions. Assuming 15% inefficiency in the plant, e.g., 2,770 BTU of energy is lost in normal plant operation, the total energy required is about 25,793 BTU. The resulting energy efficiency of the process is about 42% (10,752/25,793×100).

Figure 2:
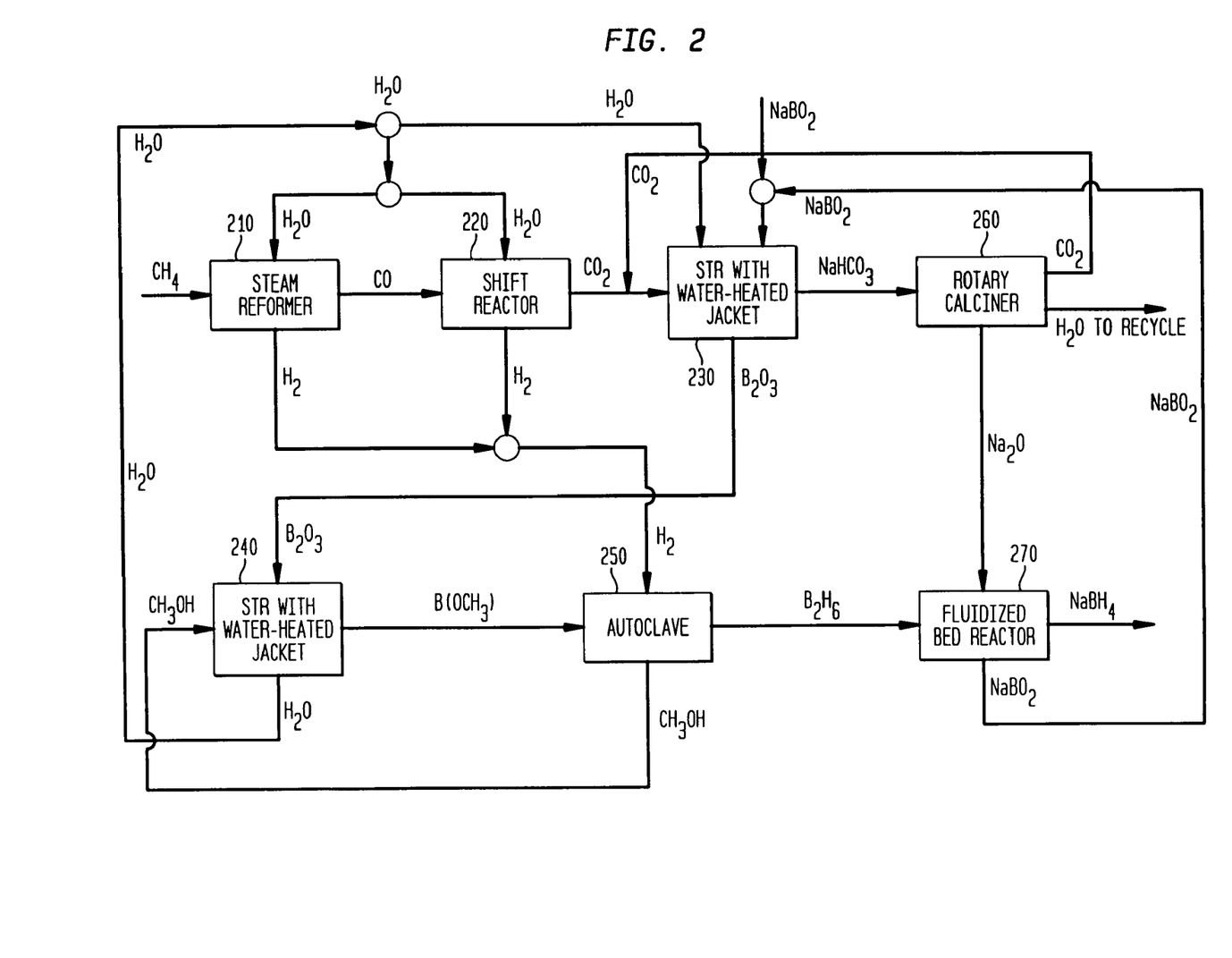
FIG. 2 is a flow diagram, which illustrates another embodiment for producing borohydride compounds in accordance with the present invention.

In another embodiment of the present invention, as illustrated in FIG. 2, YBO$_2$ is chosen to be sodium borate and HX is chosen to be ROH. In this embodiment, borate is converted to a trialkoxyborane via a boric oxide intermediate. The trialkoxyborane is then converted to diborane, which is known to disproportionate to borohydride under appropriate reaction conditions. This process can be further described in part by the following set of chemical reactions and formulae.

In the first step, boric oxide is prepared by acidic dehydration of sodium borate with carbon dioxide as shown in equation (24). Mineral acids can be used as alternatives, but will eliminate the carbon dioxide to sodium bicarbonate recycle loop, as described below.

$$2NaBO_2 + 2CO_2 + H_2O \rightarrow 2NaHCO_3 + B_2O_3 \tag{24}$$

For example, this reaction can be performed in a stirred tank reactor with a water-heated jacket 230, as illustrated in FIG. 2. In such an apparatus, a slurry of sodium borate and water can be stirred in a reactor equipped with paddle type stirring at temperatures ranging from about room temperature to about 250° C., preferably from about 175 to about 200° C. The reactor can be pressurized with carbon dioxide at a pressure from about 10 (0.68 atm.) to about 750 psi (51 atm.), preferably from about 30 to about 40 atm. The boric oxide produced can be removed from the reactor by any method or process known to one skilled in the art, such as by filtration.

The boric oxide produced in the reaction of equation (24) can then be reacted with methanol in an appropriate reactor, as shown in equation (25).

$$B_2O_3 + 6CH_3OH \rightarrow 2B(OCH_3)_3 + 3H_2O \tag{25}$$

For example, this reaction can be performed in a stirred tank reactor with a water-heated jacket 240. Solid boric oxide can be heated to a temperature from about room temperature to about 100° C., preferably from about 55 to about 70° C., as a slurry in methanol for about 1 to about 6 hours in a reactor equipped with paddle type stirring. The trimethoxyborane can be removed as it forms by any method or process known to one skilled in the art, such as by distillation.

The reactions of equations (24) and (25) can be taken separately or combined into one step to directly convert NaBO$_2$ to B(OCH$_3$)$_3$ in methanol with carbon dioxide as shown in equation (20). The combined process is exothermic and can be driven to completion by continuous distillation of trimethoxyborane from the reactor, not shown.

$$NaBO_2 + CO_2 + 3CH_3OH \rightarrow B(OCH_3)_3 + NaHCO_3 + H_2O \tag{26}$$

Both versions are encompassed by this embodiment of the present invention. Diborane can then be produced by direct hydrogenation of the trimethoxyborane, which can be obtained from the reactions of equations (25) and/or (26). After separation from the other products of reactions (25) and/or (26) by any method or process known to the skilled artisan, the trimethoxyborane can be reacted with hydrogen gas in a pressurized apparatus to produce diborane and methanol, as shown in equation (27).

$$B(OCH_3)_3 + 3H_2 \rightarrow \tfrac{1}{2}B_2H_6 + 3CH_3OH \tag{27}$$

For example, this reaction can be performed in an autoclave 250, as illustrated in FIG. 2. An autoclave containing trimethoxyborane can be pressurized with hydrogen gas at a pressure from about 100 (6.8 atm.) to about 1000 psi (68 atm.), preferably from about 7 to about 15 atm., and heated at temperatures ranging from about 100 to about 500° C., preferably from about 200 to about 300° C. Typical hydrogenation catalysts, including Raney nickel and activated palladium, silver, or platinum metals and other Group VIII metals, can be used to promote the reaction. The methanol can be separated from the gas stream by any process or method known to the skilled artisan, such as by condensation, and recycled in the process.

Diborane can undergo asymmetric cleavage and subsequent disproportionation as shown in reaction (28) by reaction with any small, hard base, such as $F^-$, $OH^-$, $O^{2-}$, $NH_3$, $Cl^-$, $CH_3NH_2$, and $(CH_3)_2NH$. Additional examples of hard bases are provided in Shriver et al., *Inorganic Chemistry* (1990, W.H. Freeman Company), which is incorporated herein by reference. In concentrated aqueous sodium hydroxide, for example, at reduced temperatures (e.g., from about −40° C. to about 0° C., preferably at about −20° C.), the disproportionation occurs in two steps: (i) asymmetric cleavage into a borohydride fragment and a $BH_2^+$ fragment which coordinates two hydroxides and then (ii) disproportionation of the $BH_2^+$ fragment into an additional borohydride and a borate.

Water can be replaced with an aprotic solvent or a nonaqueous polar solvent to minimize competitive hydrolysis of the $BH_2^+$ fragment and allow the disproportionation to be achieved with higher efficiency, thereby providing greater yield. Hydrolysis, on the other hand, results in the release of hydrogen rather than disproportionation, and a substantial energy loss occurs. Examples of acceptable aprotic solvents include: hydrocarbons, such as hexane or heptane; amides, such as, dimethylacetamide; and glymes, such as, diethylene glycol dimethyl ether (diglyme) and tetra(ethylene glycol) dimethyl ether (tetraglyme). Water can also be replaced with a nonaqueous polar solvent, such as methanol, ethanol, propanol, and isopropanol.

Alternatively, this reaction can be accomplished without the use of a solvent, as illustrated by the chemical reaction of equation (28). A gas stream of diborane obtained from reaction (27) can be passed through solid sodium oxide in an appropriate apparatus. Diborane is an extremely reactive compound, and is known to react from the gas stream.

$$2Na_2O + 2B_2H_6 \rightarrow 3NaBH_4 + NaBO_2 \tag{28}$$

For example, this reaction can be performed in a fluidized bed reactor 270 (dry, with a gas stream) or a jacketed stirred tank reactor, not shown (with a solvent). In a fluidized bed reactor, a gas stream of diborane at pressures ranging from about atmospheric (1 atm.) to about 100 psi (6.8 atm.) can be passed through solid sodium oxide at temperatures ranging from about −30° C. to about 70° C., preferably from about 0° C. to about 40° C., under an inert atmosphere, such as, nitrogen or argon gas. Alternatively, in a reactor equipped with paddle type stirring and a jacket that allows water heating or cooling, diborane can be bubbled through a slurry of sodium oxide in a glyme at temperatures ranging from about −30° C. to about 70° C., preferably from about 0° C. to about 40° C., under an inert atmosphere, such as, nitrogen or argon gas. The resulting sodium borohydride can then be separated from sodium borate by any process or method known to the skilled artisan, such as by liquid extraction. The separated sodium borate can be recycled for use in the initial step of the process, i.e., the reaction of equation (24).

The reactants for the process of this embodiment can be purchased from commercial sources, or, preferably, generated in the process plant as previously described. For example, the carbon dioxide used in the reaction of equation (24) and the sodium oxide used in the reaction of eq. (28) can be obtained by dehydrating in an appropriate apparatus the sodium bicarbonate generated in the reaction of equation (24), as shown in equation (29). This reaction is endothermic.

$$2NaHCO_3 \rightarrow 2Na_2O + 2CO_2 + H_2O \tag{29}$$

For example, this reaction can be performed in a rotary calciner (kiln) 260, such as a model manufactured by the Bethlehem Corporation. A slurry of sodium bicarbonate can be heated to a temperature from about 450 to about 1000° C., preferably from about 800 to about 900° C., at a pressure from about 0 to about 5 atm., preferably from about 0 to about 1 atm., in a rotary dryer with a heated screw agitator, which disperses the slurry along the length of the reactor. Solid sodium oxide can be separated from a gas stream of carbon dioxide and steam by any method or process known to the skilled artisan.

Furthermore, the hydrogen gas used in the chemical reaction of equation (27) can be obtained by steam reforming of methane, as described in equation (30).

$$CH_4 + H_2O \rightarrow 3H_2 + CO \tag{30}$$

For example, this reaction can be performed in a steam reactor 210, as illustrated in FIG. 2. As is well known to the skilled artisan, methane can be mixed with steam at temperatures of about 450 to 750° C. and pressures from about 30 to about 40 atmospheres as the mixture enters catalyst tubes containing nickel catalyst to produce a gas stream of hydrogen and carbon monoxide. The hot gas stream can then be passed through a heat exchanger to provide process heat if needed. The water used in this reaction can be obtained from commercial sources, the water produced by the chemical reaction of equation (25) in apparatus 240, and/or the reaction of equation (29) in apparatus 260. The methane can be obtained from commercial sources.

The carbon dioxide used in the chemical reaction of equation (24) can be obtained from the reaction of equation (29). Additional carbon dioxide can also be obtained by processing the carbon monoxide obtained from the chemical reaction of equation (30) in an appropriate apparatus, as illustrated by equation (31).

$$CO + H_2O \rightarrow CO_2 + H_2 \tag{31}$$

For example, this reaction can be performed in a shift reactor 220, as illustrated in FIG. 2. As is well-known to the skilled artisan, such an apparatus allows the reaction of CO and steam by passing the gas stream over iron and copper catalysts at about 425° C. to produce hydrogen and carbon monoxide. The hydrogen produced by this reaction can be used in the chemical reaction of equation (27). The water used in this reaction can be obtained from commercial sources, from the water produced by the chemical reaction of equation (25) in apparatus 240, and/or the reaction of equation (29) in apparatus 260.

The net equation of this embodiment is the same as the first embodiment:

$$NaBO_2 + CH_4 \rightarrow NaBH_4 + CO_2 \tag{23}$$

The steps represented by equations (27), (29) and (30) are the key energy-consuming steps of the process. Calculated on a per pound of sodium borohydride produced basis, this reaction requires the energy equivalent of 9094 BTU of methane and an additional 6701 BTU of energy to drive the reactions. Assuming 15% inefficiency in the plant, approximately 1005 BTU of energy is lost as a result of normal plant operation. The total energy required by the system to practice the chemical reaction of eq. 17 is about 16,800 BTU per pound of sodium borohydride produced. According to the calculation described earlier, the energy efficiency of the sodium borohydride (e.g., the comparison of the energy needed for production versus the energy provided) would be 64% (10,752/16,800×100).

The energy required for the individual reactions is shown below.

| | | BTU/lb NaBH$_4$ |
|---|---|---|
| 4NaBO$_2$ + 4CO$_2$ + 2H$_2$O → | 4NaHCO$_3$ + 2B$_2$O$_3$ | |
| 4NaHCO$_3$ → | 4Na$_2$O + 4CO$_2$ + 2H$_2$O | 1707 BTU (1801 kJ) |
| 2B$_2$O$_3$ + 12CH$_3$OH → | 4B(OCH$_3$)$_3$ + 6H$_2$O | |
| 4B(OCH$_3$)$_3$ + 12H$_2$ → | 2B$_2$H$_6$ + 12CH$_3$OH | 3282 BTU (3463 kJ) |
| 3CH$_4$ + 3H$_2$O → | 9H$_2$ + 3CO | 1712 BTU (1806 kJ) |
| 3CO + 3H$_2$O → | 3H$_2$ + 3CO$_2$ | |
| 2Na$_2$O + 2B$_2$H$_6$ → | 3NaBH$_4$ + NaBO$_2$ | |
| 3NaBO$_2$ + 3CH$_4$ → | 3NaBH$_4$ + 3CO$_2$ | 6701 BTU (7070 kJ) |

The overall process of this embodiment is also favorable in that it is a cyclic process best represented by the listing of all reactions below. As shown, the reaction consumes only methane and borate and produces only sodium borohydride and carbon dioxide. All other reagents can be regenerated within the process. Thus, the process represents a closed loop, requiring only the input of methane and energy.

Alternatively, diborane used in the chemical reaction of equation (28) can be obtained by reacting a boric oxide with a halogen gas, such as chlorine, and then hydrogenating the resulting boron trihalide, as illustrated in the reactions of equations (29a) and (29b).

$$2B_2O_3 + 6X_2 + 3C \rightarrow 4BX_3 + 3CO_2 \quad (29a)$$

$$4BX_3 + 12H_2 \rightarrow 2B_2H_6 + 12HX \quad (29b)$$

wherein X is selected from the group consisting of F, Cl, Br, and I. Reactions of boric oxides are well-known in the art, as described in Hughes, "Production of the Boranes and Related Research," p. 3.

Typically, BX$_3$ can be obtained by heating solid boric oxide and carbon coal to a temperature between about 250 and about 850° C., preferably between about 600 and about 700° C., in an autoclave under an inert atmosphere. The reactor can be pressurized with halogen gas, at a pressure of from between about atmospheric pressure (1 atm.) to about 500 psi (34 atm.), preferably from between about 5 and about 10 atm. The boron trihalide can be condensed from the gas stream and isolated as a liquid by any method and/or process known to the skilled artisan.

The use of excess carbon allows the in situ reduction of carbon dioxide to carbon monoxide as illustrated by the following chemical reaction: CO$_2$+C→2CO. The resulting carbon monoxide can then be introduced into a shift reactor to react with steam to produce additional process hydrogen.

Diborane can also be obtained from hydrogenation of alkylboranes, which are prepared by reacting boron trihalides with organoaluminum compounds or Grignard reagents of the formula RMgX, wherein R is a C1 to C4 alkyl, and X is Cl, Br, or I). Such reactions are well-known in the art, as described in Shriver et al., *Inorganic Chemistry* (1990, W.H. Freeman Company), which is incorporated herein by reference. An example of this type of reaction is provided below in reactions (29c) and (29d). In these reactions, liquid boron trihalide (BX$_3$) can be added to solid alkylaluminum under an inert atmosphere in a stir-tank reactor equipped with turbine stirring at a temperature from about −30° C. to about 100° C., preferably from about 20° C. to about 50° C. The alkylborane can be removed by distillation, and thereafter hydrogenated.

$$2BX_3 + Al_2(R)_6 \rightarrow 2AlX_3 + 2BR_3 \quad (29c)$$

$$4BR_3 + 12H_2 \rightarrow 2B_2H_6 + 12HR \quad (29d)$$

wherein R is independently selected from the group consisting of CH$_3$ and C$_2$H$_5$.

It should be noted that of the above processes for obtaining a Y-containing species and a boron containing species can be combined with either of the two ways of producing a Y-borohydride and carbon dioxide. One embodiment of one possible combination is shown in the reactions below:

| | | BTU/lb NaBH$_4$ |
|---|---|---|
| 4NaBO$_2$ + 4CO$_2$ + 2H$_2$O | → 4NaHCO$_3$ + 2B$_2$O$_3$ | |
| 4NaHCO$_3$ | → 4Na$_2$O + 4CO$_2$ + 2H$_2$O | 1707 BTU (1801 kJ) |
| 2B$_2$O$_3$ + 12CH$_3$OH | → 4B(OCH$_3$)$_3$ + 6H$_2$O | |
| CH$_4$ + Na$_2$O | → 2Na + CO + 2H$_2$ | 1641 BTU (1731 kJ) |
| 2Na + H$_2$ | → 2NaH | |
| 2B(OMe)$_3$ + 2NaH | → 2NaHB(OMe)$_3$ | |
| CH$_4$ + H$_2$O | → 3H$_2$ + CO | 807 BTU (851 kJ) |
| 2CO + 2H$_2$O | → 2H$_2$ + 2CO$_2$ | |
| 2B(OMe)$_3$ + 6H$_2$ | → B$_2$H$_6$ + 6MeOH | 3430 BTU (3619 kJ) |
| 2NaHB(OMe)$_3$ + B$_2$H$_6$ | → 2NaBH$_4$ + 2B(OMe)$_3$ | |
| 2NaBO$_2$ + 2CH$_4$ | → 2NaBH$_4$ + 2CO$_2$ | 7585 BTU (8002 kJ) |

In this process, 15% plant inefficiency leads to a loss of about 1138 BTU (1200 kJ). This number must be added to about 7585 BTU (8002 kJ) necessary for the above reactions, and about 9094 BTU (9594 kJ) for the energy equivalent of methane. Thus, the overall energy needed for this plant process requires about 17,817 BTU (18,796 kJ), and the overall efficiency of the process is about 60% (10,752 BTU/17,817 BTU×100).

In another embodiment, X is chosen to be chlorine. This embodiment provides two alternative processes to produce boron trichloride from boric oxide. Boric oxide can be reacted with either chlorine gas or HCl. These two routes require two different recycle loops. In the HCl recycle loop, diborane gas produced from hydrogenation of BCl$_3$ can be separated from the HCl byproduct which is reclaimed for reaction with boric oxide. These reactions are shown below, with the reactions involving the recycle loop shown in boldface.

| | | |
|---|---|---|
| 2NaBO$_2$ + 2CO$_2$ + H$_2$O | → | 2NaHCO$_3$ + B$_2$O$_3$ |
| 2NaHCO$_3$ | → | Na$_2$O + 2CO$_2$ + H$_2$O |
| B$_2$O$_3$ + 6HCl | → | 2BCl$_3$ + 3H$_2$O |
| CH$_4$ + Na$_2$O | → | 2Na + CO + 2H$_2$ |
| 2Na + H$_2$ | → | 2NaH |
| 2BCl$_3$ + 2NaH | → | 2NaHBCl$_3$ |
| CH$_4$ + H$_2$O | → | 3H$_2$ + CO |
| 2CO + 2H$_2$O | → | 2H$_2$ + 2CO$_2$ |
| 2BCl$_3$ + 6H$_2$ | → | B$_2$H$_6$ + 6HCl |
| 2NaHBCl$_3$ + B$_2$H$_6$ | → | 2NaBH$_4$ + 2BCl$_3$ |
| 2NaBO$_2$ + 2CH$_4$ | → | 2NaBH$_4$ + 2CO$_2$ |

Alternatively, boric oxide can also be reacted with chlorine gas. In this case, the hydrogen chloride byproduct from the boron trichloride hydrogenation is converted to chlorine gas by reaction with oxygen and catalytic CuCl, which is nonstoichiometric and is not consumed in the process. These reactions are shown below, with the reactions involving the recycle loop shown in boldface.

| | | |
|---|---|---|
| $2NaBO_2 + 2CO_2 + H_2O$ | → | $2NaHCO_3 + B_2O_3$ |
| $2NaHCO_3$ | → | $Na_2O + 2CO_2 + H_2O$ |
| $B_2O_3 + 3/2C + 3Cl_2$ | → | $2BCl_3 + 3/2CO_2$ |
| $CH_4 + Na_2O$ | → | $2Na + CO + 2H_2$ |
| $2Na + H_2$ | → | $2NaH$ |
| $2BCl_3 + 2NaH$ | → | $2NaHBCl_3$ |
| $CH_4 + H_2O$ | → | $3H_2 + CO$ |
| $2CO + 2H_2O$ | → | $2H_2 + 2CO_2$ |
| $2BCl_3 + 6H_2$ | → | $B_2H_6 + 6HCl$ |
| $6HCl + 3/2O_2 +$ $CuCl(solid)$ | → | $3Cl_2 + 3H_2O$ |
| $2NaHBCl_3 + B_2H_6$ | → | $2NaBH_4 + 2BCl_3$ |
| $2NaBO_2 + 2CH_4 + 3/2O_2 + 3/2C$ | → | $2NaBH_4 + 7/2CO_2$ |

Carbon dioxide can be reclaimed from the boric oxide, carbon, and chlorine reaction shown in boldface above. In the presence of excess carbon, carbon dioxide is converted to carbon monoxide through the reaction shown below:

$$CO_2 + C \rightarrow 2CO.$$

The carbon monoxide can then be introduced into the shift reactor for preparation of additional hydrogen. Ideally, this would occur in one step as shown below:

$$B_2O_3 + 3C + 3Cl_2 \rightarrow 2BCl_3 + 3CO.$$

Methane can be used instead of carbon in a variation on the route shown above. A stream of methane gas passed through hot boric oxide will generate carbon and hydrogen gas in the reactor. Ideally, this process would be coupled with direct hydrogenation of boron trichloride to produce diborane. This variation is shown below, with the recycle loops in boldface.

| | | |
|---|---|---|
| $2NaBO_2 + 2CO_2 + H_2O$ | → | $2NaHCO_3 + B_2O_3$ |
| $2NaHCO_3$ | → | $Na_2O + 2CO_2 + H_2O$ |
| $B_2O_3 + 3/2CH_4 + 3Cl_2$ | → | $2BCl_3 + 3/2CO_2 + H_2$ |
| $2BCl_3 + 6H_2$ | → | $B_2H_6 + 6HCl$ |
| $CH_4 + Na_2O$ | → | $2Na + CO + H_2$ |
| $2Na + H_2$ | → | $2NaH$ |
| $2BCl_3 + 2NaH$ | → | $2NaHBCl_3$ |
| $CH_4 + H_2O$ | → | $3H_2 + CO$ |
| $2CO + 2H_2O$ | → | $2H_2 + 2CO_2$ |
| $6HCl + 3/2O_2 + CuCl$ $(solid)$ | → | $3Cl_2 + 3H_2O$ |
| $2NaHBCl_3 + B_2H_6$ | → | $2NaBH_4 + 2BCl_3$ |
| $2NaBO_2 + 7/2CH_4 + 3/2O_2$ | → | $2NaBH_4 + 7/2CO_2 + 3H_2$ |

Alternative methods to produce the boron trichloride species would use other known chlorinating agents beside hydrogen chloride and chlorine, which are the preferred reagents. Other possible chlorinating agents include phosgene ($COCl_2$) and methods to generate phosgene in situ (such as by adding carbon monoxide to chlorine gas), phosgene equivalents including diphosgene (trichloromethylchloroformate) and triphosgene (bis(trichloromethyl)carbonate), thionyl chloride ($SOCl_2$), and phosphorus chlorides including phosphorus trichloride and phosphorus pentachloride.

Another possible embodiment of the present invention involves using both chlorine and the methoxy group as "X" in the reactions. This set of reactions, shown below, allows for recycle loops involving both hydrogen chloride and $B(OMe)_3$. Reactions involving recycle loops are printed in boldface.

| | | |
|---|---|---|
| $2NaBO_2 + 2CO_2 + H_2O$ | → | $2NaHCO_3 + B_2O_3$ |
| $B_2O_3 + 6HCl$ | → | $2BCl_3 + 3H_2O$ |
| $2NaHCO_3$ | → | $Na_2O + H_2O + 2CO_2$ |
| $Na_2O + CH_4$ | → | $2Na + CO + 2H_2$ |
| $CH_4 + H_2O$ | → | $CO + 3H_2$ |
| $2CO + 2H_2O$ | → | $2H_2 + 2CO_2$ |
| $2Na + H_2$ | → | $2NaH$ |
| $2NaH + 2B(OMe)_3$ | → | $2NaHB(OMe)_3$ |
| $2BCl_3 + 6H_2$ | → | $B_2H_6 + 6HCl$ |
| $B_2H_6 + 2NaHB(OMe)_3$ | → | $2NaBH_4 + 2B(OMe)_3$ |
| $2NaBO_2 + 2CH_4$ | → | $2NaBH_4 + 2CO_2$ |

What is claimed is:

1. A process for producing borohydride compounds, comprising:
   (A) reacting methane with a Y-containing species of formula $Y_2O$ to obtain Y, carbon monoxide and $H_2$;
   (B) reacting the Y with $H_2$ to obtain YH;
   (C) reacting a boron-containing species of the formula $BX_3$ with the YH to obtain $YHBX_3$;
   (D) separately reacting $BX_3$ with $H_2$ to obtain $B_2H_6$ and HX; and
   (E) reacting the $YHBX_3$ with $B_2H_6$ to obtain $YBH_4$ and $BX_3$,
   wherein Y is selected from the group consisting of the alkali metals, pseudo-alkali metals, an ammonium ion, and quaternary amines of formula $NR_4^+$, wherein R is independently selected from H and straight or branched C1 to C4 alkyl groups; and
   wherein X is selected from the group consisting of halides, alcohols, alkoxides, chalcogens, and chalcogenides.

2. The process according to claim 1, wherein Y is selected from the group consisting of H, Li, Na, K, Rb, Cs, Fr, $NH_4^+$, Tl, and quaternary amines of formula $NR_4^+$, wherein R is independently selected from H and straight or branched C1 to C4 alkyl groups; and
   wherein X is selected from the group consisting of F, Cl, Br, I, At, —OH, a C1 to C4 alkoxide, O, S, Se, Te, Po, —SR, —SeR, and —TeR, wherein R is H or a straight or branched C1 to C4 alkyl group.

3. The process according to claim 2, wherein Y is selected from the group consisting of Na, Li, and K.

4. The process according to claim 1, wherein the $BX_3$ of step (D) is hydrogenated with an aldehyde selected from the group consisting of formaldehyde, benzaldehyde, acetaldehyde, and mixtures thereof.

5. The process according to claim 1, wherein the steps (D) and (E) are replaced with the following step of reacting $YHBX_3$ with $H_2$ to produce $YBH_4$ and HX.

6. The process according to claim 1, wherein the $BX_3$ produced in step (B) is recycled for use in steps (C) and (D).

7. The process according to claim 1, wherein the $H_2$ produced in step (A) is recycled for use in steps (B) and (D).

8. The process according to claim 1, further comprising reacting methane and water to produce $H_2$ and carbon monoxide;
   combining the carbon monoxide produced in the previous step and in step (A);
   reacting the combined carbon monoxide with water to produce additional $H_2$ and carbon dioxide; and
   recycling the $H_2$ for use in steps (B) and (D).

9. The process according to claim 1, wherein the Y-containing species of the formula $Y_2O$ and the boron-containing species of the formula $BX_3$ are obtained by the process comprising:

(1) reacting a borate of the formula YBO$_2$ with HX to obtain YX, BX$_3$, and water;

(2) reacting the YX with water to obtain YOH and HX; and (3) converting the YOH to Y$_2$O and H$_2$O, wherein Y and X are defined in claim 1.

10. The process according to claim 9, wherein Y is an alkaline earth metal; and wherein YBO$_2$ is replaced with Y(BO$_2$)$_2$, YX is replaced with YX2, YOH is replaced with Y(OH)$_2$, Y$_2$O is replaced with YO, YH is replaced with YH$_2$, YHBX$_3$ is replaced with Y(HBX$_3$)$_2$, and YBH$_4$ is replaced with Y(BH$_4$)$_2$.

11. The process according to claim 9, wherein the BX$_3$ is obtained by the process comprising: reacting a borate ore of the formula Y$_2$B$_2$O$_4$ with CO$_2$ and H$_2$O to obtain YHCO$_3$ and B(OH)$_3$; and reacting the B(OH)$_3$ with HX to obtain BX$_3$ and H$_2$O.

12. The process according to claim 9, wherein the X is independently selected to be the same or different in each applicable step.

13. The process according to claim 9, wherein the BX$_3$ produced in step (E) is recycled for use in steps (C) and (D).

14. The process according to claim 9, wherein the H$_2$ produced in step (A) is recycled for use in steps (B) and (D).

15. The process according to claim 9, wherein the HX produced in steps (D) and (2) are recycled for use in step (1).

16. The process according to claim 9, further comprising reacting methane and water to produce H$_2$ and carbon monoxide;

combining the carbon monoxide produced in the previous step and in step (A);

reacting the combined carbon monoxide with water to produce additional H$_2$ and carbon dioxide; and recycling the H$_2$ for use in steps (B) and (D).

17. The process according to claim 1, wherein the Y-containing species of formula Y$_2$O and the boron-containing species of the formula BX$_3$ and obtained by the process comprising:

(i) reacting a borate of the formula YBO$_2$ with CO$_2$ and H$_2$O to obtain YHCO$_3$ and B$_2$O$_3$;

(ii) converting the YHCO$_3$ to Y$_2$O, CO$_2$, and H$_2$O; and (iii) reacting the B$_2$O$_3$ with HX to obtain BX$_3$ and H$_2$O, wherein Y and X are defined in claim 1.

18. The process according to claim 17, wherein Y is an alkaline earth metal; and wherein YBO$_2$ is replaced with Y(BO$_2$)$_2$, YHCO$_3$ is replaced with Y(HCO$_3$)$_2$, Y$_2$O is replaced with YO, YH is replaced with YH$_2$, YHBX$_3$ is replaced with Y(HBX$_3$)$_2$, and YBH$_4$ is replaced with Y(BH$_4$)$_2$.

19. The process according to claim 17, wherein the BX$_3$ and YHCO$_3$ are obtained by the process comprising: reacting a borate ore of the formula Y$_2$B$_2$O$_4$ with CO$_2$ and H$_2$O to obtain YHCO$_3$ and B(OH)$_3$; and reacting the B(OH)$_3$ with HX to obtain BX$_3$ and H$_2$O.

20. The process according to claim 17, wherein the B$_2$O$_3$ and YHCO$_3$ are obtained by the process comprising reacting a borate ore of the formula Y$_2$B$_2$O$_4$ with CO$_2$ and water to obtain YHCO$_3$ and B$_2$O$_3$.

21. The process according to claim 17, wherein the X is independently selected to be the same or different in each applicable step.

22. The process according to claim 17, wherein steps (ii) and (A) are substituted with the following steps (ii1) and (A1):

(ii1) converting YHCO$_3$ to Y$_2$CO$_3$, water and carbon dioxide; and (A1) reacting the Y$_2$CO$_3$ with carbon to obtain 2Y and carbon monoxide.

23. The process according to claim 17, wherein the BX$_3$ produced in step (E) is recycled for use in steps (C) and (D).

24. The process according to claim 17, wherein the H$_2$ produced in step (A) is recycled for use in steps (B) and (D).

25. The process according to claim 17, wherein the HX produced in step (D) is recycled for use in step (iii).

26. The process according to claim 17, wherein carbon dioxide produced in step (ii) is recycled for use in step (i).

27. The process according to claim 17, further comprising reacting methane and water to produce H$_2$ and carbon monoxide;

combining the carbon monoxide produced in the previous step and in step (A);

reacting the combined carbon monoxide with water to produce additional H$_2$ and carbon dioxide;

recycling the H$_2$ for use in steps (B) and (D); and recycling the carbon dioxide for use in step (i).

* * * * *